(12) United States Patent
Hsieh

(10) Patent No.: US 10,202,803 B2
(45) Date of Patent: Feb. 12, 2019

(54) DOOR OPERATOR HAVING LOCK MECHANISM

(71) Applicant: Chung-Hsien Hsieh, New Taipei (TW)

(72) Inventor: Chung-Hsien Hsieh, New Taipei (TW)

(*) Notice: Subject to any disclaimer, the term of this patent is extended or adjusted under 35 U.S.C. 154(b) by 191 days.

(21) Appl. No.: 15/077,959

(22) Filed: Mar. 23, 2016

(65) Prior Publication Data

US 2017/0089134 A1    Mar. 30, 2017

(30) Foreign Application Priority Data

Sep. 30, 2015   (TW) .............................. 104131990 A

(51) Int. Cl.
| | |
|---|---|
| *E06B 9/74* | (2006.01) |
| *E06B 9/80* | (2006.01) |
| *E05F 11/04* | (2006.01) |
| *E06B 9/76* | (2006.01) |
| *E06B 9/84* | (2006.01) |
| *F16D 51/32* | (2006.01) |
| *F16D 65/22* | (2006.01) |
| *E05F 5/04* | (2006.01) |

(52) U.S. Cl.
CPC ................ *E06B 9/80* (2013.01); *E05F 11/04* (2013.01); *E06B 9/74* (2013.01); *E06B 9/76* (2013.01); *E06B 9/84* (2013.01); *F16D 51/32* (2013.01); *F16D 65/22* (2013.01); *E05F 2005/043* (2013.01); *E06B 2009/801* (2013.01); *E06B 2009/807* (2013.01)

(58) Field of Classification Search
CPC ..... E06B 9/80; E06B 9/74; E06B 9/84; E06B 9/76; E06B 2009/801; E06B 2009/807; F16D 65/22; F16D 51/32; F16D 55/02; E05F 11/04; E05F 2005/043
See application file for complete search history.

(56) References Cited

U.S. PATENT DOCUMENTS

| | | | |
|---|---|---|---|
| 2,583,428 A | 1/1952 | Houplain | ................... 192/223.2 |
| 4,838,333 A * | 6/1989 | Mottura | .................... E06B 9/80 |
| | | | 160/296 |

(Continued)

FOREIGN PATENT DOCUMENTS

| | | |
|---|---|---|
| CN | 104851185 A | 8/2015 |
| CN | 104879014 A | 9/2015 |

(Continued)

OTHER PUBLICATIONS

TW Opinion of Examination of Application No. 104131990, dated May 31, 2016, TW.

(Continued)

*Primary Examiner* — Katherine W Mitchell
*Assistant Examiner* — Abe Massad
(74) *Attorney, Agent, or Firm* — Bui Garcia-Zamor; Jessica H. Bui, Esq.

(57) ABSTRACT

A door operator comprises a rotary shaft, a chain disk for rotating the rotary shaft, and a locking mechanism for locking the rotary shaft. The locking mechanism comprises a bidirectional rotary block, a plurality of push pins and anti-rotation posts. When the chain disk rotates, the push pins urge the bidirectional rotary block to rotate the rotary shaft, and when the rotary shaft rotates, the of anti-rotation posts lock the bidirectional rotary block, and preclude the rotary shaft from rotating.

8 Claims, 7 Drawing Sheets

(56) References Cited

U.S. PATENT DOCUMENTS

| | | | | |
|---|---|---|---|---|
| 5,386,891 A * | 2/1995 | Shea | ...................... | A62C 2/242 |
| | | | | 160/7 |
| 6,530,863 B2 * | 3/2003 | Balli | ........................ | E06B 9/74 |
| | | | | 160/310 |
| 7,055,283 B2 * | 6/2006 | Hsieh | ...................... | E05F 15/40 |
| | | | | 160/188 |
| 8,567,573 B2 * | 10/2013 | Hsieh | ........................ | E06B 5/16 |
| | | | | 160/9 |
| 8,657,096 B2 | 2/2014 | Hsieh | ........................ | 192/223.2 |
| 8,915,287 B2 | 12/2014 | Hsieh | ........................... | 160/297 |
| 9,464,479 B1 * | 10/2016 | Kee | ...................... | E05D 13/003 |
| 9,518,415 B2 * | 12/2016 | Hsieh | ........................ | E05F 3/16 |
| 2012/0024484 A1 * | 2/2012 | Hsieh | ...................... | A62C 2/24 |
| | | | | 160/291 |
| 2013/0074409 A1 | 3/2013 | Hsieh | ............................ | 49/139 |
| 2014/0332172 A1 | 11/2014 | Hsieh | ........................... | 160/133 |
| 2014/0342864 A1 | 11/2014 | Hsieh | ........................... | 474/152 |

FOREIGN PATENT DOCUMENTS

| | | |
|---|---|---|
| TW | 201314010 A1 | 4/2013 |
| TW | 201443330 A | 11/2014 |

OTHER PUBLICATIONS

Chinese Office Action 201510788378.7, dated Oct. 27, 2017, CN.
IPOS Search Report, dated Jul. 6, 2017, Singapore.
AU Examination Report of Application No. 2016231561, dated Feb. 24, 2017, Australia.

* cited by examiner

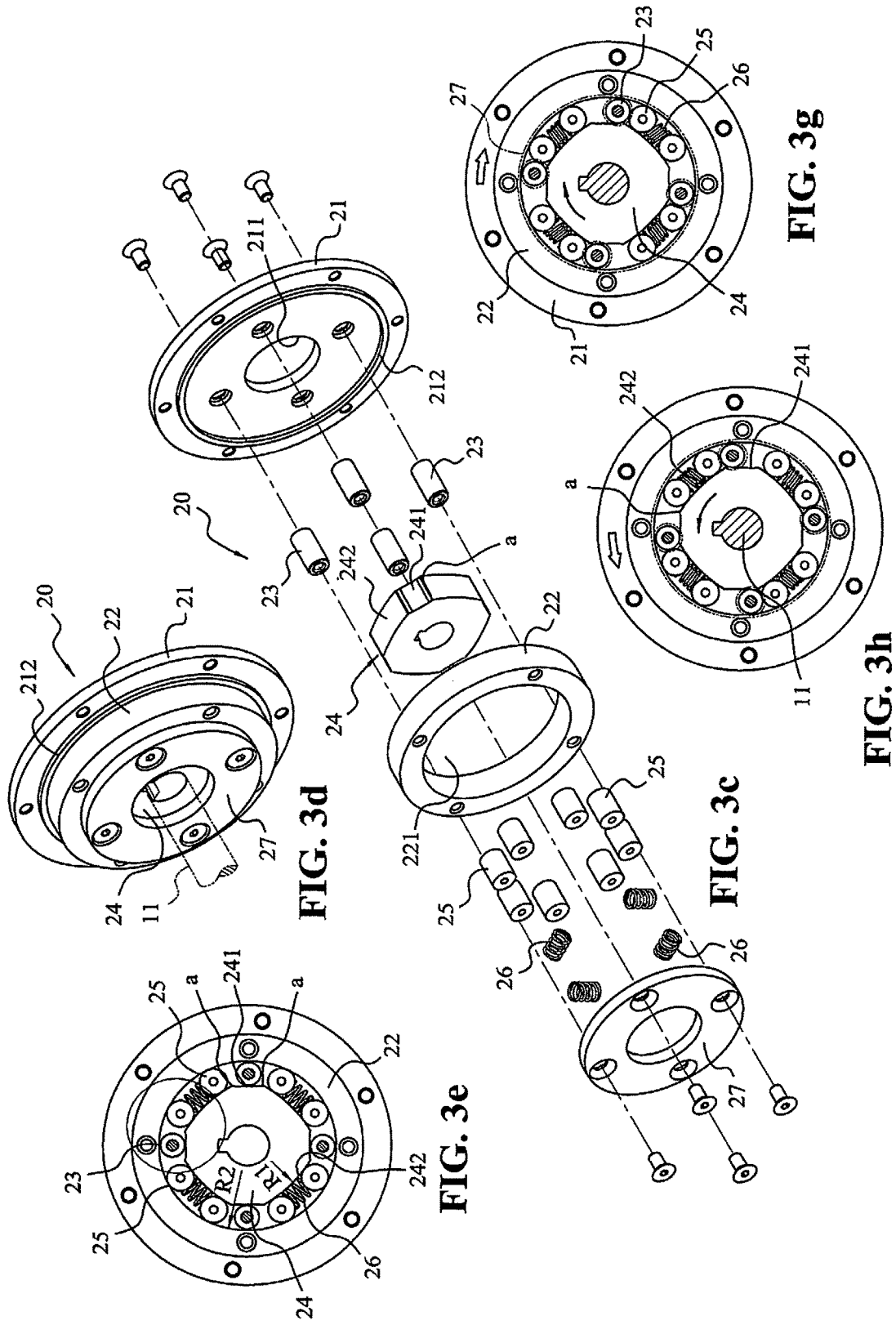

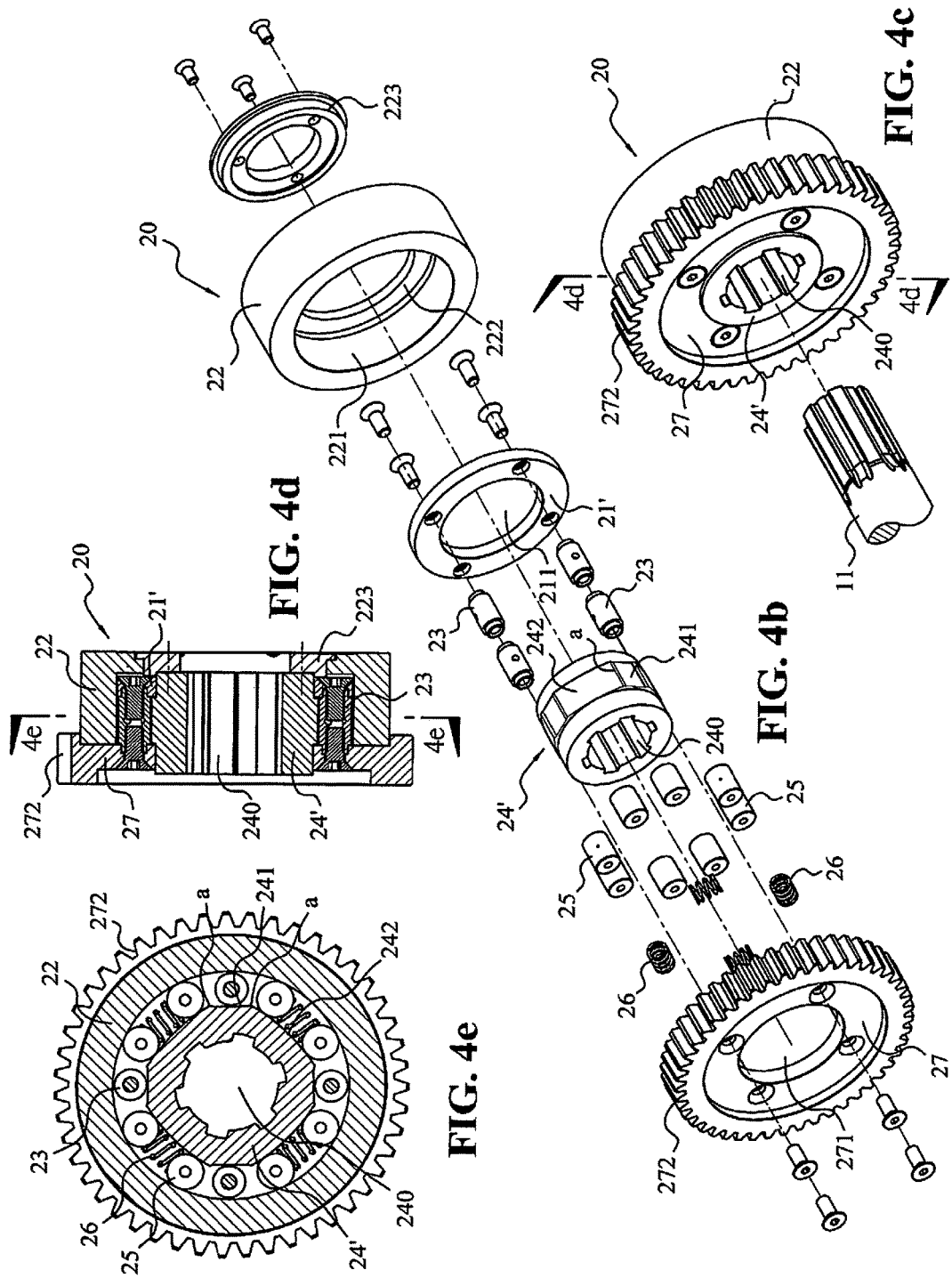

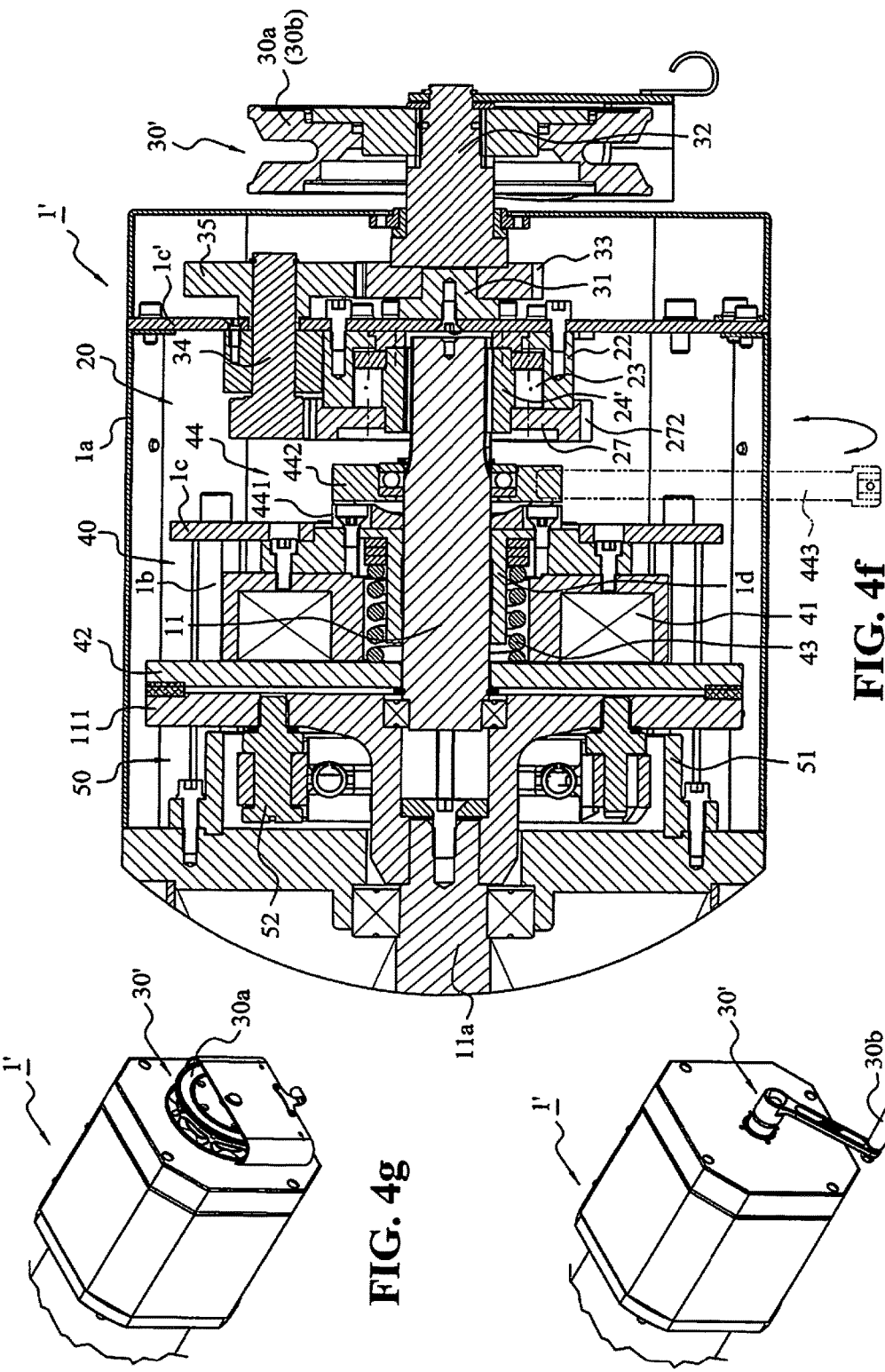

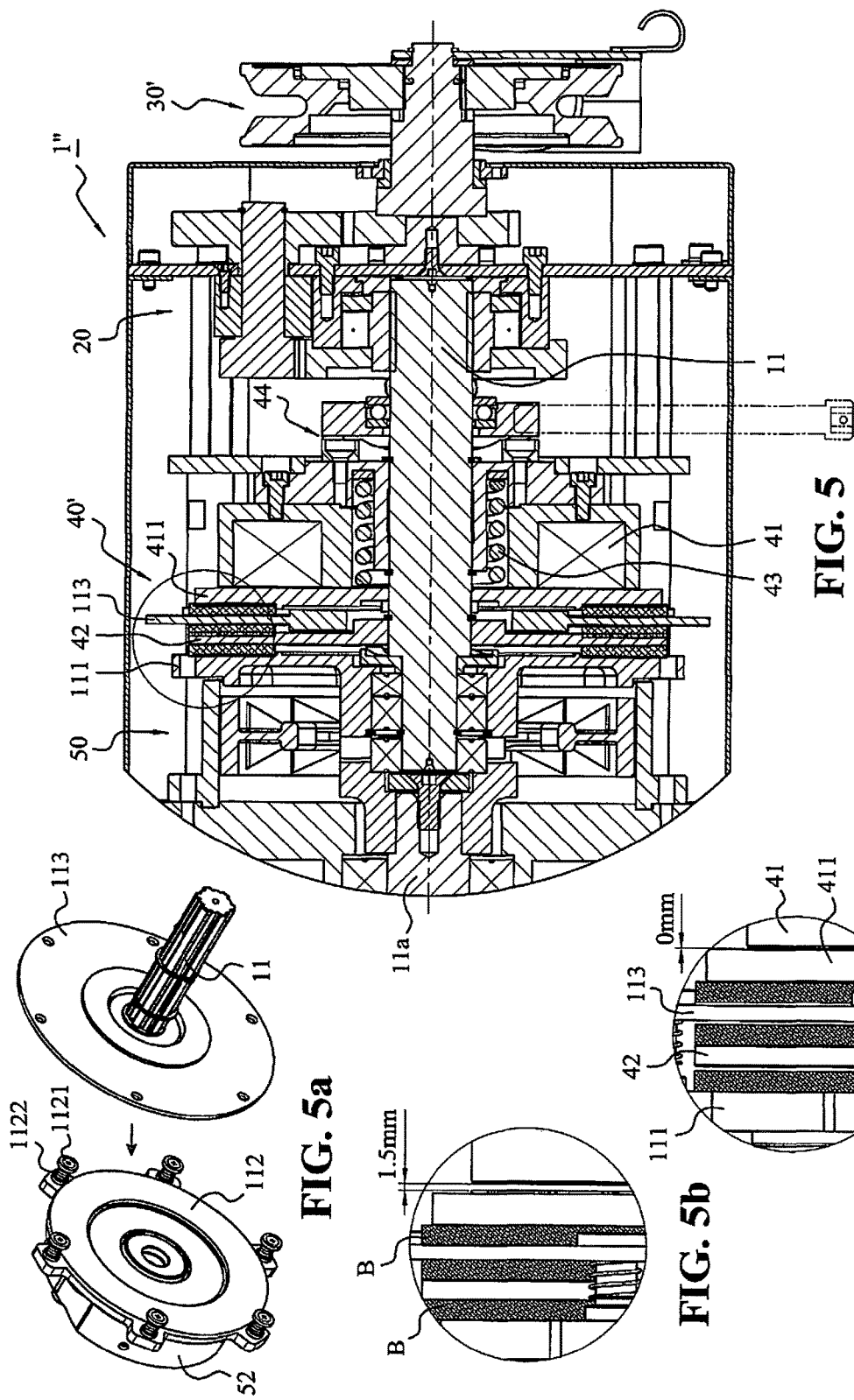

DOOR OPERATOR HAVING LOCK MECHANISM

BACKGROUND OF THE INVENTION

1. Field of the Invention

The present invention relates to a door operator, in particular to a door operator comprising a locking mechanism with a bidirectional rotary block.

2. Description of the Prior Art

FIG. 1 shows a locking mechanism having a chain disk for a manual door operator disclosed in U.S. Pat. No. 8,915,287 issued to the Applicant. The locking mechanism comprises a wedge wheel (36') fixedly connected to a drive shaft (37') and accommodated in a ring socket (34'). The wedge wheel (36') includes a plurality of axial slots (361') each having two bottom surfaces (362') and two side walls (364'). Each of the bottom surfaces (362') has a first end portion (P1') and a second end portion (P2'). The first end portion (P1') is spaced from the inner wall of the ring socket (34') by a first distance (D1'). The second end portion (P2') is spaced from the inner wall of the ring socket (34') by a second distance (D2'). The first distance (D1') is smaller than the second distance (D2'). A plurality of fixed posts (351') are axially received in the axial slots (361') and located at the bottom surface (362'). Each movable post (365') has a diameter greater than the first distance (D1') and smaller than the second distance (D2'). Each fixed posts (351') has a diameter smaller than the first distance (D1'). A plurality of compression springs (366') are positioned on the side wall (364') and urge against the plurality of movable posts (365') to move them away from the side wall (364').

When the chain disk rotates, the plurality of fixed posts (351') urge against the plurality of movable posts (365'), so that the wedge wheel (36') is driven to rotate the drive shaft (37'), thereby rolling up or dropping down the rolling door. When the chain disk stops rotating, the movable posts (365') are locked by the wedge wheel (36'), so that the drive shaft (37') is not rotatable, thereby stops the operation of the rolling door. The manual door operator omits the conventional clutch device, and thus it is simple in construction, compact in size, easy to operate and low in cost.

Further, FIGS. 2 and 2a illustrate U.S. Pat. No. 8,657,096 issued to the Applicant, which discloses an electric door operator having a chain disk locking mechanism. The door operator includes an electric motor, and a chain disk locking mechanism (4'). The drive shaft of the motor is axially connected to a stationary shaft (41'), and the chain disk locking mechanism is connected with the stationary shaft (41'). The chain disk locking mechanism (4') comprises a chain disk (42') having a central circular bore (421'), a plurality of fixed pins (422') axially located in the central circular bore (421'), an engaging rotary block (43') located in the central circular bore (421'), and comprises a number of axial slots (431') that correspond to the plurality of fixed pins (422'). Each axial slot (431') includes a first end face (4311') and two second end faces (4312'). The two second end faces (4312') are disposed respectively on both sides of the first end faces (4311'). The first end face (4311') and an inner wall (4210') of the central circular bore (421') are spaced apart by a first radial gap (D1'). The second end face (4312') and the inner wall (4210') of the central circular bore (421') are spaced apart by a second radial gap (D2'). The first radial gap (D1') is narrower than the second radial gap (D2').

A plurality of moving pins (5') are received within the axial slots (431'), and are located between the second end faces (4312') and the center circular bores (421'). The diameter (R') of each movable pin is greater than the first radial gap (D1'), and less than the second gap (D2'). The diameter (r') of each fixed pins (422') is less than the first gap (D1'). Each axial slot (431') comprises two end walls (4313'), which is disposed at both sides of the axial slot (431'), and adjacent to the two second end faces (4312'). Each end wall (4313') is provided with a compression spring (51') which urges against the plurality of moving pins (5') to move the pins away from the end wall.

When the chain disk (42') is pulled to rotate, the fixed pins (422') press the moving pins (5') so as to push the engaging rotary block (43') to rotate with the stationary shaft (41') together. When the stationary shaft (41') intends to rotate, the first end faces (4311') of the engaging rotary block (43') and the inner wall of the central circular bore (421') block the moving pins (5), and prohibits the stationary shaft (41') from rotating.

However, the above engaging rotary block has the following disadvantages in manufacture and use:

(1) Since the engaging rotary block includes axial slots having planar, included angles, the chain disk tends to slip at the initial pull. That is to say, the engaging rotary block has a relatively weak torsional strength, and thus is not suitable to be used on a big rolling door.

(2) The axial slot is trapezoidal in shape, and thus has a large diameter, and needs a special machine for machining. As such, the manufacturing is time-consuming and expensive.

(3) The axial slot is complicated, and thus requires high precision in machining, and the defective rate of the product is high.

SUMMARY OF THE INVENTION

The object of the present invention is to provide a bidirectional rotary block for the locking mechanism of a chain disk. This axial slot of the bidirectional rotary block has included angles formed on an arc surface, and the torsional strength is about two times as great as that of conventional ones.

A further object of the present invention is to provide a bidirectional rotary block for the locking mechanism, which has a diameter that is less than that of conventional one. It is simple in structure and does not require a special machine for machining. As such, it is easy to machine and cheap in manufacturing cost.

A further object of the present invention is to provide a door operator having a locking mechanism with a bidirectional rotary block, wherein the bidirectional rotary block has a spline shaft hole at the center that would simplify the structure of the manually operable brake release mechanism as the rotary shaft can slide axially in the spline shaft hole.

Another object of the present invention is to provide a door operator having a locking mechanism with a bidirectional rotary block, wherein speed reduction is effected between the force output shaft of the chain disk and the rotary shaft of the locking mechanism, so that the opening and/or closing of the rolling door manually is facilitated.

To achieve the above objects, the present invention provides a door operator comprising a chain disk, a rotary shaft, and a locking mechanism. The chain disk is configured to rotate the rotary shaft, and the locking mechanism is adapted to lock the rotary shaft. The locking mechanism comprises an end disc, an outer ring portion, a plurality of push pins, a bidirectional rotary block, a plurality of anti-rotation posts, and a plurality of springs. The end disc is connected to the chain disk. The end disc includes an axial hole at the center, and a positioning ring at one end face thereof. The outer ring portion has one end positioned in the positioning ring, and defines a central receiving portion with the end disc. The plurality of push pins are axially arranged along the inner circumference of the central receiving portion, and are equidistantly spaced from each other. Each push pin has one end secured on the end disk. A bidirectional rotary block is received in the central receiving portion and fixedly connected to the rotary shaft. The rotary shaft has one end pivoted in the axial hole.

The bidirectional rotary block comprises a plurality of axial slots and a plurality of radial arc faces arranged in an alternate fashion. One side of each radial arc face intersects with one side of each axial slot adjacent thereto to form a latching angle which is spaced from an inner wall of the outer ring portion by a first distance. A midpoint of each radial arc face is spaced from the inner wall of the outer ring portion by a second distance. Each radial arc face has a radius greater than a radius of the inner wall of the outer ring portion, and tapers from the second distance towards the first distance. The plurality of the axial slots corresponds to the plurality of push pins. Each axial slot is spaced from the inner wall of the outer ring portion by a third distance. Each push pin has a diameter greater than the first distance and less than the third distance. Each push pin is slidable on each axial slot and can be locked at the latching angle. A plurality of anti-rotation posts is arranged in pairs of two, with each pair provided in between the radial arc faces and the inner wall of the outer ring portion. Each anti-rotation post has a diameter greater than the first distance and less than the second distance. A spring is arranged between two anti-rotation posts of each pair to provide a potential energy to the posts so that the posts are slidably moved constantly in the direction of the latching angle.

The door operator further comprises a cover plate pivotally mounted exterior of the rotary shaft, and covers the other end of the outer ring portion. The cover plate is securely connected to the other end of the push pins. As such, when the chain disk rotates, the plurality of push pins urge the bidirectional rotary block to rotate, thereby rolling up or dropping down the rolling door. When the chain disk stops to rotate, the preloaded force of the rolling door actuates the rotary shaft to rotate. The anti-rotation posts will then lock the bidirectional rotary block, and preclude the rotary shaft from rotating. As a result, the rolling door cannot be rolled up or dropped down. Clutch mechanism can be omitted for this mechanism, which would simplify the construction and reduce the dimension of the system.

According to a further embodiment of the present invention, an electrical door operator comprising an electric motor, a rotary shaft, a locking mechanism, and a manual mechanism is provided. The electric motor includes a drive shaft pivotally connected to the rotary shaft. The locking mechanism is designed to lock the rotary shaft, and the manual mechanism is adapted to rotate the rotary shaft. The present invention further includes an electromagnetic brake mechanism engageably and disengageably disposed between the driving shaft and the rotary shaft. One end of the drive shaft is fixedly connected with a drive disk. A second end of the rotary shaft is pivotally mounted at the drive disk in an axially slidable fashion. The electromagnetic brake mechanism comprises an electromagnetic generator, a brake disc, and a spring member. The electromagnetic generator is disposed proximate to the second end of the rotary shaft and fixedly connected to the housing of the door operator. The rotary shaft is axially and slidably disposed on the brake disc. One end face of the brake disc is arranged to oppose the drive disc and the other end to oppose the electromagnetic generator. A spring member is disposed outside the rotary shaft to bias the brake disc to abut the drive disc to lock the drive shaft. The electromagnetic generator is designed to attract the brake disc, thereby releases the drive.

Accordingly, when the motor rotates, the electromagnetic generator is excited to attract the brake disc, so as to disengage the brake disk from the drive disk to be under a brake release state. When the motor stops rotating, the electromagnetic generator is not excited. The brake disk is subject to the action of the elastic force of the spring member, and urges against the drive disk to be in the brake state. Accordingly, when the motor in under the non-operational state, apart from locking the drive shaft of the motor by the locking mechanism, it is also possible to lock the rotary shaft by the electromagnetic brake mechanism, which will also prohibit the drive shaft of the motor from rotating freely. Therefore, a dual braking effect can be achieved.

Preferably, a partition plate is further provided to secure to a housing of the door operator. The partition plate has one end face fixedly connected to the outer ring portion of the locking mechanism, and the other end face of the partition plate is provided with a bearing support. The manual mechanism comprises a force output shaft. One end of the force output shaft extends beyond the housing and is provided with a chain disk or a crank. The other end of the force output shaft is provided with a drive gear which is pivotally mounted at the bearing support. The cover plate of the locking mechanism has an external gear. The drive gear drives the external gear through a gear set, and in turn drives the rotary shaft. As such, the driving force exerted by the force output shaft is transmitted to the rotary shaft of the locking mechanism in a gradually reduced fashion by the gear set. Therefore, the manual opening and closing of the rolling door can be made easily and in a labor saving manner.

Preferably, the drive disk of the present invention is axially connected with a driven disc, and the disc brake is located between the drive disk and the driven disk. The electromagnetic brake mechanism also includes a driving disk which is axially and slidably mounted on the rotary shaft, and is disposed between the electromagnetic generator and the driven disc. When the electric motor is not in operation, the spring member urges the driving disc and the brake disc to abut the driven disc and the drive disc, whereby the drive shaft is locked and preclude from rotating. When the electric motor is in operation, the electromagnetic generator is excited and attracts the driving disc, so that the driving disc and the brake disc disengage from the driven disc and drive disc to release the drive shaft. Accordingly, the present invention may provide additional brake discs to increase the braking force based on the load needed. For example, the quantity of the brake disc may be randomly increased or decreased to obtain the appropriate braking force depending on the weight of the rolling door, the horsepower of the motor, or other influential factors.

Preferably, the present invention further comprises a brake release mechanism that is arranged between the locking mechanism and the electromagnetic brake mechanism and surrounds the rotary shaft. The brake release mechanism comprises a stationary cam member fixedly connected to the electromagnetic generator, a movable cam member fixedly connected to the rotary shaft, and a release lever. The movable cam member is connected to the stationary cam member by means of the opposed cam faces. The release lever has one end connected to the movable cam member, and the other end extends beyond the housing of the door operator. When the release lever is actuated, the movable cam member is rotated to displace the rotary shaft axially in a sliding fashion. In the meantime, the driving disc releases the driven disc, and the brake disc disengages from the drive disc, whereby the drive shaft is released. Therefore, in special cases, for example, under circumstances such as power failure, maintenance or testing for installation where the rolling door has to be closed without power, the release lever can be actuated to release the driving disk, the driven disk. The drive shaft of the electric motor can then disengage from the rotary shaft and the rolling door will drop down by gravity.

Preferably, the present invention further comprises a centrifugal braking mechanism that surrounds the outer periphery of the coupling. The centrifugal brake mechanism includes a brake drum fixedly connected to the housing of the door operator, and a pair of centrifugal brake shoes. The pair of centrifugal brake shoes are secured to the disk drive at one end, and urged against the brake drum due to the centrifugal force at the other end, thereby frictionally engage the brake drum to reduce the rotational speed of the drive shaft to a predetermined safe range. In particular, for a warehouse door with a large area and opens or closes with high speed, the security can be assured.

Preferably, the present invention further comprises a reduction mechanism connected in between the other end of the motor drive shaft of the electric motor and an output shaft. The reduction mechanism reduces the rotational speed of the electric motor by means of the cooperation between a sun gear set, a planetary gear set, and an internal gear set, and transmits the reduced speed to the output shaft. The reduction mechanism is designed to control the speed of the rolling door rolling up or down. The reduction speed and the gear ratio can be selected as desired depending on the installed location of the rolling door and the weight of the door panel.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

FIG. 3b shows a cross-sectional view taken along line 3b-3b of FIG. 3a;

FIG. 3c illustrates an exploded, perspective view of the locking mechanism according to a preferred embodiment of the present invention;

FIG. 3d shows a perspective view of the locking mechanism of FIG. 3c in assembled state;

FIG. 3e shows a cross-sectional view of the locking mechanism of FIG. 3d;

FIG. 3g is another cross-sectional view of the locking mechanism, which shows that the push pins urge against a bidirectional rotary block to rotate in the direction of the arrow;

FIG. 3h is a further cross-sectional view of the locking mechanism, which shows that the push pins urge against a bidirectional rotary block to rotate in the direction of the arrow;

FIG. 4b illustrates an exploded, perspective view of the locking mechanism for the electric door operator;

FIG. 4c is a perspective view of the locking mechanism shown in FIG. 4b in an assembled state, in which the coupling relationship with the rotary shaft is shown in detail;

FIG. 4d is a longitudinal, sectional view of the locking mechanism shown in FIG. 4c;

FIG. 4e is a transverse, sectional view of the locking mechanism shown in FIG. 4c;

FIG. 4f shows an enlarged sectional view of a portion shown in FIG. 4;

FIG. 4g shows that a force-applying end of the manual mechanism of the electric door operator is a chain disk mechanism;

FIG. 4h shows that a force-applying end of the manual mechanism of the electric door operator is a crank mechanism;

FIG. 5 illustrates a sectional view of the electromagnetic brake mechanism for the electric door operator of FIG. 4, in which similar mechanisms are omitted;

FIG. 5a illustrates an exploded, perspective view of some components of the electromagnetic brake mechanism for the electric door operator;

FIG. 5b shows an enlarged view of the encircled portion in FIG. 5, in which the electromagnetic brake mechanism is in the braking state;

FIG. 5c shows the electromagnetic brake mechanism of FIG. 5b in the brake releasing state.

DETAILED DESCRIPTION OF THE INVENTION

Figure 1:
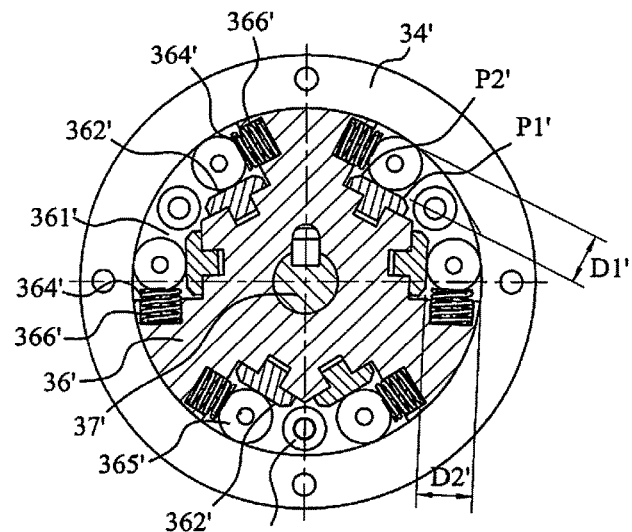
FIG. 1 shows a transverse cross-sectional view of the chain locking mechanism of a manually operable door operator as illustrated in applicant's U.S. Pat. No. 8,915,287.
Figure 2:
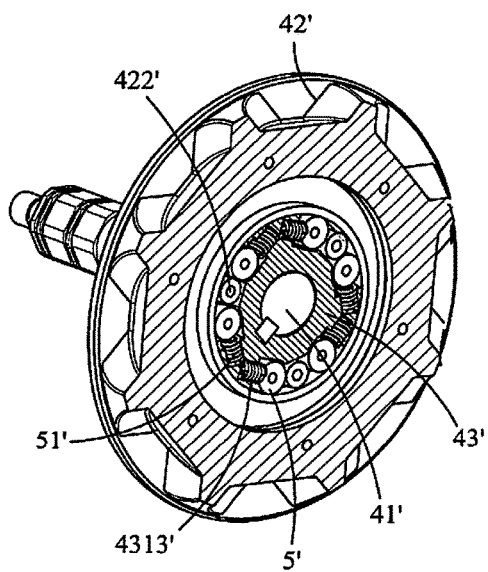
FIGS. 2 and 2a, respectively, show a perspective and a transverse cross-sectional view of the chain locking mechanism of an electrical door operator as illustrated in applicant's another U.S. Pat. No. 8,657,096.
Figure 2A:
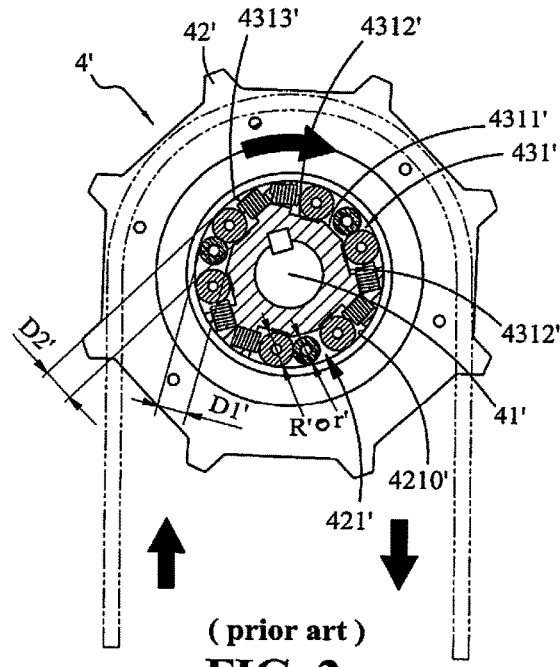

Referring to FIGS. 3 and 3a-3h which show a lock mechanism of a door operator of preferred embodiment of the present invention, which includes a bidirectional rotary block. As shown in the drawings, a manual type door operator 1 includes a rotary shaft 11 having one end serves as a force applying end and the other end as the output end, and a locking mechanism 20 disposed between the force applying end and output end of the rotary shaft 11 for braking the rotary shaft 11. The force applying end of the rotary shaft 11 is fixedly connected to a chain disk 30, and the chain disc 30 is circumferentially surrounded by a chain 301. Pulling the chain 301 will actuate to rotate the rotary shaft 11. The output end of the rotary shaft is fixedly connected to an output wheel 12. The output wheel 12 drives the reel shaft to roll up or unwind the rolling door (not shown) by means of the cooperation between a known chain and the reel shaft.

As shown in FIG. 3c, the locking mechanism 20 includes an end disk 21, an outer ring portion 22, a plurality of push pins 23, a bidirectional rotary block 24, a plurality of anti-rotation posts 25, a plurality of springs 26, and a cover plate 27. The end plate 21 has a central axial hole 211 in which the rotary shaft 11 is rotatably accommodated. The end disk 21 is connected to the chain disk 30 at one end, and the other end forms into a protruding positioning ring 212. As shown in FIG. 3d, the outer ring portion 22 has one end located in the positioning ring 212, and defines a central receiving portion 221 (refer to FIG. 3c) with the positioning ring 212. The plurality of push pins 23 are arranged axially and equidistantly along the inner periphery of the central receiving portion 221, and each has one end connected to the end disk 21. The bidirectional rotary block 24 is located in the central receiving portion 221, and fixed connected with the rotary shaft 11. The bidirectional rotary block 24 includes a plurality of axial slots 241 and a plurality of radial arc faces 242 at the circumference thereof, wherein the plurality of radial arc faces 242 and the plurality of axial slots 241 are alternately arranged.

Figure 3B:
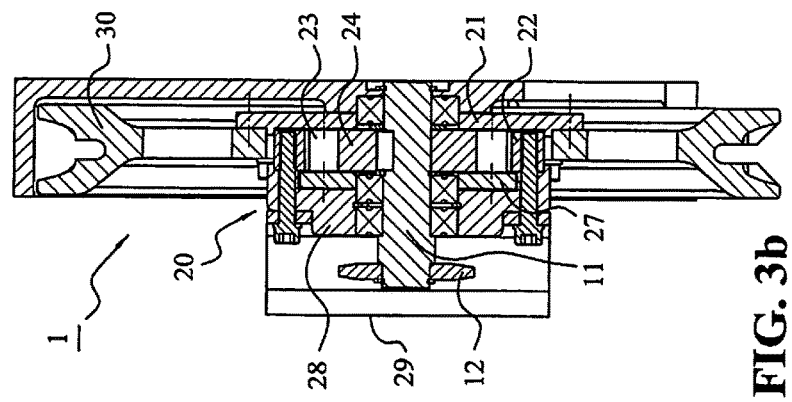
Figure 3A:
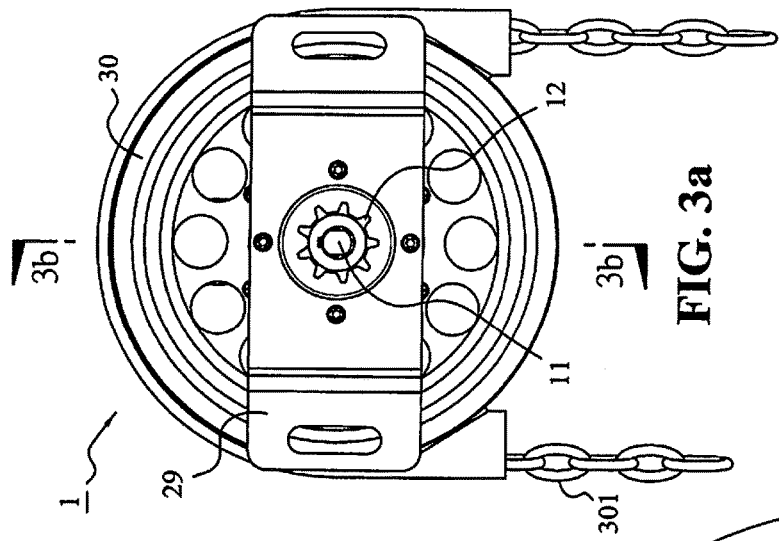
FIG. 3a schematically shows a front view of the manually operable door operator.
Figure 3F:
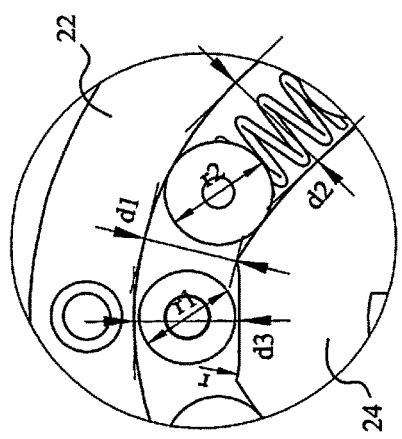
FIG. 3f shows an enlarged view of the encircled portion in FIG. 3e.
Figure 3:
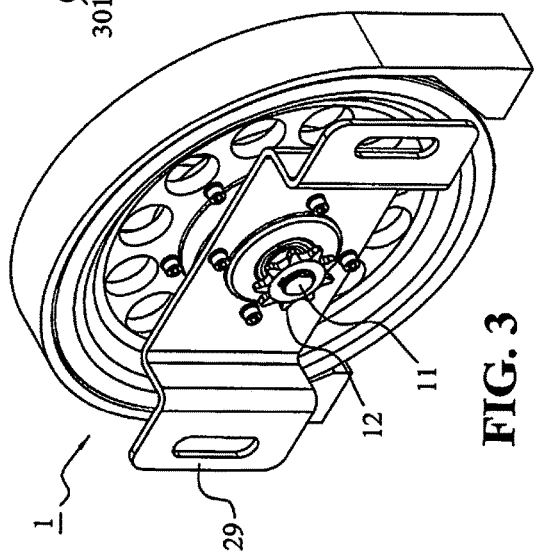
FIG. 3 shows a perspective view of a preferred embodiment of the lock mechanism for the manually operable door operator of the present invention.
Figure 4A:
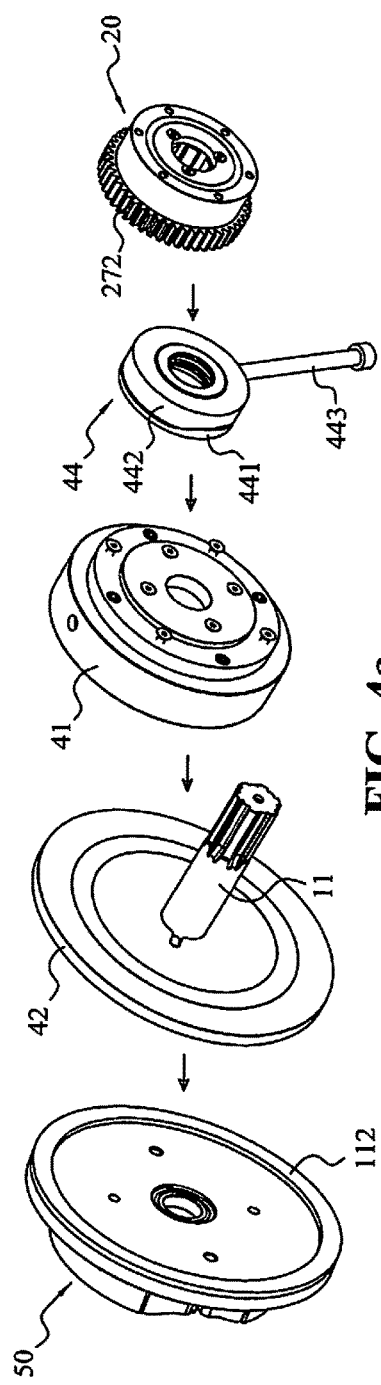
FIG. 4a illustrates an exploded, perspective view of the electric door operator, where a portion of the mechanisms is omitted.
Figure 4:
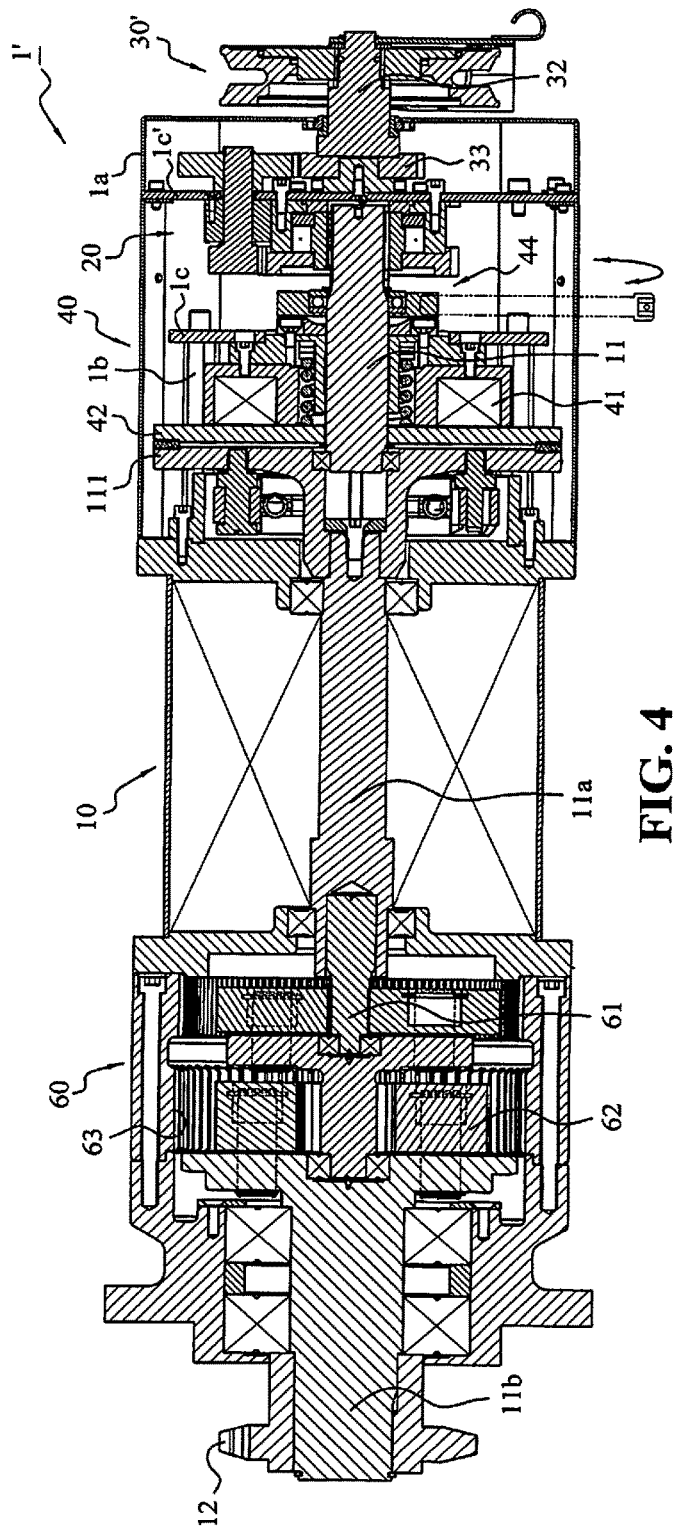
FIG. 4 shows a sectional view of a preferred embodiment of an electric door operator having a locking mechanism according to the present invention.

Referring to FIGS. 3e and 3f, each radial arc face 242 has a radius R1 greater than a radius R2 of the inner wall of the outer ring portion 22. Therefore, a latching angle "a" is formed between two end points of each radial arc face 242 and the corresponding end point of an adjacent axial slot 241. The latching angle "a" is spaced from the inner wall of the outer ring portion 22 by a first distance d1, and a midpoint of the radial arc 242 is spaced from the inner wall of the outer ring portion 22 by a second distance d2. As the radius of the radial arc face 242 is larger than the radius of the inner wall of the outer ring portion 22, the distance between the radial arc face and the inner wall of the outer ring portion 22 gradually diminishes from the second distance d2 toward the first distance d1. Each axial slot 241 is spaced from the inner wall of the outer ring portion 22 by a third distance d3 where the axial slot corresponds to the push pin 23. The push pin 23 has a diameter r1 greater than the first distance d1 but less than the third distance d3, so that the push pin is slidable on each axial slot 241 and can be locked at the latching angle "a". Preferably, two adjacent side edges of the axial slot 241 comprises a fillet which has a radius r that is the same as the radius r1 of the push pin 23 so as to guide the push pin 23 towards the latches angle "a".

A pair of anti-rotation posts 25 is arranged in between the radial arc face 242 and the inner wall of the corresponding outer ring portion 22. Each anti-rotation post has a diameter r2 greater than the first distance d1 and less than the second distance d2. A spring 26 is disposed between the pair of anti-rotation posts 25 to provide potential energy to the posts so that the posts tend to slidably move constantly in the direction towards the first direction d1. The cover plate 27 covers the other end of the outer ring portion 22, and is securely connected to the other end of the plurality of push pins 23 by means of a fastener. In addition, the other end of the rotary shaft 11 is rotatably pivoted in the central axial hole of the cover plate 27.

Referring again to FIGS. 3, 3a and 3b, the door operator 1 according to the present invention further comprises an outer cover 28, and a substrate 29. The outer cover 28 is provided outside the locking mechanism 20, and has a central shaft hole. The other end of the rotary shaft 11 of the door operator 1 is pivoted at the central shaft hole, and extends beyond the outer cover 28 to fixedly connect with the output wheel 12. The substrate 29 holds the door operator 1, and fixedly connects with the outer portion 22 and the outer cover 28 by a fastener.

When the chain 301 is pulled, the chain disk 30 is driven to rotate, and the end plate 21 rotates accordingly. Each of the plurality of push pins 23 that rotates along with the end plate 21 will push the corresponding anti-rotation post 25 in the direction of rotation away from the latching angle "a". As the push pin 23 urges against the latching angle "a", the bidirectional rotary block 24 is moved to rotate along with the rotary shaft 11 (as shown in FIGS. 3g and 3h). Accordingly, the output wheel 12 will roll-up or unwind the rolling door (directs to conventional rolling up or unwinding actions of the rolling door). When cease to rotate the chain disk 30, the pre-load of the rolling door (which is the own weight of the rolling door) will drive the rotary shaft 11 to rotate reversely. Therefore, the anti-rotation posts 25 in the counter direction of rotation are subject to the elastic force of the springs 26 to slide toward the direction of the latching angle "a", thereby locking the bidirectional rotary block 24, and in turn prohibit the rotary shaft 11 from rotating. Accordingly, the rolling door ceases to roll-up or drop down.

FIGS. 4 and 4a-4h illustrate a preferred embodiment of the lock mechanism of the electrical rolling door of the present invention, which has a bidirectional rotary block. As shown, the electric door operator 1' of the present embodiment primarily includes an electric motor 10, a locking mechanism 20, a manual mechanism 30', and an electromagnetic brake mechanism 40. The electric motor 10 includes a drive shaft 11a having one end coupled to the rotary shaft 11. A first end of the rotary shaft 11 acts as a force applying end, and is connected to the manual mechanism 30' to drive the rotary shaft 11 for rotation. The other end of the drive shaft 11a is connected to one end of an output shaft 11b. The other end of the output shaft 11b is connected with an output wheel 12, and by means of, for example, the operation between a conventional chain and reel shaft, to drive the reel shaft to roll up or unwind the door operator (not shown, as it is conventional). The lock locking mechanism 20 is disposed proximate to the first end of the rotary shaft 11 to restrict the rotary shaft 11 from rotating. The electromagnetic brake mechanism 40 is disengageably connected to the second end of the rotary shaft 11 and the drive shaft 11a.

Please refer to FIGS. 4b-4e and 3f. The locking mechanism 20 of this preferred embodiment is substantially similar to the previous embodiment as mentioned hereinbefore in basic construction and working principle. As such, like numerals are used to indicate like elements. As illustrated, the lock mechanism 20 of the present invention comprises an outer ring portion 22, an inner ring portion 21', a plurality of push pins 23, a bidirectional rotary block 24', a plurality of anti-rotation posts 25, and a plurality of springs 26. The outer ring portion 22 has a central receiving portion 221, and an annular seat 222 formed at its bottom end. The inner ring portion 21' has a central shaft hole 211, and is accommodated in the central receiving portion 221, and rotatably abuts the seat 222. The plurality of push pins 23 are axially connected to the inner ring portion 21' at one end and are located within the central receiving portion 221 along with the inner ring portion 21'. The bidirectional rotary block 24' is pivotally disposed in the central shaft hole 211 at one end thereof, and is located in the central receiving portion 211 along with the inner ring portion 21'. The center hole of the bidirectional rotary block 24' is a spline shaft hole 240. The other end of the rotary shaft 11 is formed into a spline shaft which is axially slidable through the spline shaft hole 240 and disposed therein, but is not rotatable relative to the bidirectional rotary block 24'. A circular groove seat 223 is pivotally mounted in the seat 222 of the outer ring portion 22, and is connected with the bidirectional rotary block 24' via a fastener.

The bidirectional rotary block 24 comprises a plurality of axial slots 241 and a plurality of radial arc faces 242, wherein the axial slots 241 are arranged in an alternate fashion with the radial arc faces 242. Each radial arc face 242 has a radius R1 greater than a radius R2 of the inner wall of the outer ring portion 22. Therefore, a latching angle "a" is formed between two end points of each radial arc face 242 and the corresponding end point of an adjacent axial slot 241. The latching angle "a" is spaced from the inner wall of the outer ring portion 22 by a first distance d1, and a midpoint of the radial arc 242 is spaced from the inner wall of the outer ring portion 22 by a second distance d2. As the radius of the radial arc face 242 is larger than the radius of the inner wall of the outer ring portion 22, the distance between the radial arc face 242 and the inner wall of the outer ring portion 22 gradually diminishes from the second distance d2 toward the first distance d1. Each axial slot 241 is spaced from the inner wall of the outer ring portion 22 by a third distance d3 where the axial slot 241 corresponds to the push pin 23. The push pin 23 has a diameter r1 greater than the first distance d1 but less than the third distance d3, so that the push pin 23 is slidable on each axial slot 241 and can be locked at the latching angle "a". Preferably, two adjacent side edges of the axial slot 241 comprises a fillet which has a radius r that is the same as the radius r1 of the push pin 23 so as to guide the push pin 23 towards the latches angle "a" (see FIG. 3f).

Further, a pair of anti-rotation posts 25 is arranged in between the radial arc face 242 and the inner wall of the corresponding outer ring portion 22. Each anti-rotation post has a diameter r2 greater than the first distance d1 and less than the second distance d2 (FIG. 3f). A spring 26 is disposed between the pair of anti-rotation posts 25 to provide potential energy to the posts so that the posts tend to slidably move constantly in the direction towards the first direction d1. The cover plate 27 having a central shaft hole 271 is rotatably provided outside the outer ring portion 22. The other end of the bidirectional rotary block 24' is pivotally disposed in the central shaft hole 271. The cover plate 27 is securely connected to the other end of the plurality of push pins 23 by means of a fastener. Furthermore, the cover plate 27 has an external gear 272 to operatively connect with the manual mechanism 30' (will be described hereinafter).

Referring to FIGS. 4f-4h, the electrical door operator 1' of the present invention further comprises a support frame 1b for supporting upright first partition plate 1c, a second partition plate 1c' and a shaft hub 1d. The second partition plate 1c' is fixed to a housing 1a of the door operator 1'. The shaft hub 1d and the first partition plate 1c is connected together, and the rotary shaft 11 is axially movable through the shaft hub 1d. Further, the outer ring portion 20 of the locking mechanism 20 is fixed connected with one end face of the second partition plate 1c'. The other end face of the second partition plate 1c' is provided with a bearing support 31. The manual mechanism 30' comprises a force output shaft 32 having one end extends beyond the housing 1a and is provided with, for example, a chain disk 30a or a crank 30b (refer to FIGS. 4g and 4h), for actuating the force output shaft 32. The other end of the output shaft 32 is connected to a driving gear 33, and is pivotally mounted at the bearing support 31. The driving gear 33 reduces the rotational speed of the output shaft 32 by means of a pivot shaft 34 and a gear set 35, and the reduced speed is used to drive the external gear 272 on the cover plate 27, so that the rotary shaft 11 is rotated along.

Further, one end of the drive shaft 11a is fixedly connected with a drive disk 111. The second end of the rotary shaft 11 is axially slidably pivoted in the drive disk 111. The electromagnetic brake mechanism 40 comprises an electromagnetic generator 41, a brake disk 42, and a spring member 43. The shaft hub 1d is arranged to surround the outer periphery of the electromagnetic generator 41, and is fastened to the first partition plate 1c. The brake disk 42 is axially slidably disposed on the rotary shaft 11 between the drive disk 111 and the electromagnetic generator 41. A portion of the rotary shaft 11 extends axially through the center of the brake disk 42 from the side of the brake disk opposite to the drive disk 111. The spring member 43 is disposed between the shaft hub 1d and the electromagnetic generator 41. One end of the spring member 43 urges against the drive disk 111, and the other end push against the brake disk 42 to urge on the drive disk 111. When the power is supplied to the electromagnetic generator 41, a magnetic force is generated to resist the spring member 43, and when the brake disk 42 is retracted, the drive shaft 11a is released.

The electrical door operator further comprises a brake release mechanism 44 which is arranged between the locking mechanism 20 and the electromagnetic brake mechanism 40 and surrounds the rotary shaft 11. The brake release mechanism 44 comprises a stationary cam member 441 fixedly connected to the first partition plate 1c, a movable cam member 442 rotatably connected to the rotary shaft 11, and a release lever 443. On the end faces of the movable cam member 442 and the stationary cam member 441 that oppose each other, matching cam faces are provided to abut each other. The release lever 443 has one end connected to the movable cam member 442, and the other end extends beyond the housing 1a of the door operator 1'. When the release lever 443 is actuated, the cam action will cause the rotary shaft 11 to move axially forward or backward, to thereby engage the brake disk 42 with the drive disk 111, or disengage the brake disk 42 from the drive disk 111.

FIG. 4f shows that a centrifugal braking mechanism 50 is disposed to surround the outer periphery of the drive disc 111. The centrifugal brake mechanism 50 includes a brake drum 51 fixedly connected to the housing 1a of the door operator 1', and a pair of centrifugal brake shoes 52. The pair of centrifugal brake shoes 52 are secured to the drive disk at one end, and urged against the brake drum 51 due to the centrifugal force at the other end (free end), thereby frictionally engage the brake drum 51 to reduce the rotational speed of the drive shaft 11a to a predetermined safe range. Further, a reduction mechanism 60 is provided and is connected in between the other end of the drive shaft 11a of the electric motor 10 and an output shaft 11b. The reduction mechanism 60 reduces the rotational speed of the drive shaft 11a of the electric motor 10 by means of the cooperation between a sun gear set 61, a planetary gear set 62, and an internal gear set 63, and transmits the reduced speed to the output shaft 11b.

FIGS. 4d-4f illustrate the operation of the electric door operator 1' according to this embodiment. In the case of normal electricity supply, when the electric motor 10 is energized to rotate, the electromagnetic generator 41 is excited to generate a magnetic force to attract the brake disk 42 so as to disengage it from the drive disk 111. Thus, the rotary shaft 11 is disconnected from the drive shaft 11a of the motor 10. The driving force of the motor 10 then drives the reel of the rolling door through the output shaft 11b to roll up or drop down the rolling door. When the power is not supplied to the motor 10, the electromagnetic generator 41 is not excited. In this case, the brake disk 42 urges against the drive disk 111 by the action of the elastic force of the spring member 43. The locking mechanism 20 then locks the rotary shaft 11 to prohibit the rolling door from dropping down.

In short, when the motor 10 stops rotating, the preload force of the rolling door reverses the motion of the drive shaft 11a, and in turn reverses the motions of the rotary shaft 11 and bidirectional rotary block 24. The anti-rotation posts 25 in reverse direction slide toward the latching angle "a" due to the elastic force of the spring 26, thus lock the bidirectional rotary block 24' from rotating. Thus, the rotary shaft 11 can not rotate freely, and the rolling door stops dropping.

On the other hand, if it is desired to close the door in case of power failure, one can actuate the release lever 443 of the braking release mechanism 44 to rotate the movable cam member 442, and actuate the rotary shaft 11 to retract axially. The brake disc 42 then disengages from the drive disk 111, and the rotary shaft 11 disengages from the drive shaft 11a. The rolling door will then drop by its own weight to close the door. In case it is desired to open the door, one can actuate the release lever 443 to act in the reverse direction so that the rotary shaft 11 moves axially forward. As such, the brake disk 42 will abut on the drive plate 111, and the rotary shaft 11 is connected to the drive shaft 11a. Then the force output shaft 32 is rotated by means of the chain disk 30a or crank 30b. The speed is reduced by the pivot shaft 34 and the gear set 35 before driving the external gear 272 to rotate the cover plate 27. The plurality of push pins 23 that rotate along with the cover plate 27 push the anti-rotation posts 25 in the rotation direction away from the latching angle "a". The push pins 23 abut the latching angle "a" and push the bidirectional rotary block 24' to rotate, thereby actuate the rotary shaft 11 and the drive shaft 11a to rotate. The rolling door is then rolled up or dropped down by the output wheel 12.

To the contrary, when the chain disk 30a or crank 30b stops turning, the weight of the rolling door drives the drive shaft 11a reverses its motion, and in turn reverses the motions of the rotary shaft 11 and bidirectional rotary block 24. The anti-rotation posts 25 in reverse direction slide toward the latching angle "a" due to the elastic force of the spring 26, thus lock the bidirectional rotary block 24' from rotating. Thus, the rotary shaft 11 can not rotate freely, and the rolling door stops dropping.

FIGS. 5, 5a-5c show another preferred embodiment of the electric door operator having a lock mechanism according to the present invention. The electric door operator 1' of this embodiment are similar to those of the electric door operator 1' mentioned above, and so the descriptions in relation to the construction and working principle shall be omitted. This door operator 1' is different in that brake plate or brake disk can be further provided to the electromagnetic brake mechanism 40' to increase the braking force. For example, the quantity of brake disks can be increased or decreased depending on the weight of the door panels, power of the motor, or other factors so as to enhance the braking force.

As shown, a driven disk 113 is hung on the plurality of guide pins 1121 located on the drive disk 111, so as to be slidable relative to the drive disk 111. Each of the guide pins 1121 is provided with a restoring spring 1122 in order to maintain a gap between the drive disk 111 and the driven disk 113. The brake disk 42 is located in between the disk drive 111 and the driven disk 113. The electromagnetic generator 41 further includes a driving disk 411, which is axially and slidably mounted on the rotary shaft 11 and is located between the electromagnetic generator 41 and the driven disk 113, same as the brake disk 42 does. Moreover, linings B are provided on the side surface of the drive disk 111 facing the brake disk 42, the side surface of the brake disk 42 facing the driven disk 113, and the side surface of the driving disk 411 facing the driven disk 113.

Accordingly, when the motor 10 is not rotating, the spring members 43 press against the driving disk 411 and the brake disk 42 to abut the driven disk 113 and the drive disk 111 so as to connect each other in a stacking fashion, and the end faces of the components frictionally contact each other by means of the linings B. As mentioned above, the weight of the rolling door 11a is transmitted to the lock mechanism 20 through the drive shaft 11a and the rotary shaft 11, to thereby brake the drive shaft 11a from rotating. However, when the motor 10 rotates, the electromagnetic generator 41 is excited to attract the drive disk 411, so that the drive disk 411 and the brake disk 42 are actuated to disengage from the driven disk 113 and the drive disk 111, thereby releasing the drive shaft 11a. The application and operation of the electric door operator 1" of the present embodiment are similar to those of the above door operator 1', and so the descriptions in relation thereto are omitted.

Although various exemplary embodiments have been shown and described, the invention is not limited to the embodiments shown. Therefore, the scope of the invention is intended to be limited solely by the scope of the claims that follow.

What is claimed is:

1. An electrical door operator comprising an electric motor, a rotary shaft, a locking mechanism, and a manual mechanism, the electric motor having a drive shaft engageable to and disengageable from the rotary shaft in a controlled manner, the locking mechanism being adapted to lock the rotary shaft, and the manual mechanism being adapted to rotate the rotary shaft; the locking mechanism comprising:

an outer ring portion having one end provided with an annular seat which defines a central receiving portion within the outer ring portion;

an inner ring portion accommodated in the receiving portion, and rotatably abutted the annular seat;

a bidirectional rotary block having a spline shaft hole through which a first end of the rotary shaft formed into a spline shaft is axially and slidably insertable, wherein the bidirectional rotary block comprises a plurality of axial slots and a plurality of radial arc faces, each axial slot and each radial arc face are arranged in an alternating configuration, one side of each radial arc face intersects with one side of each axial slot adjacent thereto to form a latching angle which is spaced from an inner wall of the outer ring portion by a first distance, a midpoint of each radial arc face is spaced from the inner wall of the outer ring portion by a second distance, and each radial arc face has a radius greater than a radius of the inner wall of the outer ring portion;

a plurality of push pins equidistantly spaced from each other being axially arranged along an inner circumference of the central receiving portion to correspond to the plurality of the axial slots, wherein each of the plurality of push pins is secured at the inner ring portion; each axial slot is spaced from the inner wall of the outer ring portion by a third distance, and each push pin has a diameter greater than the first distance and less than the third distance, so that each push pin is slidable on each axial slot and can be locked at the latching angle; and wherein both side edges of each axial slot comprise a fillet each, and each fillet has a radius that is the same as that of the push pin;

a plurality of anti-rotation posts arranged in pairs of two, wherein each anti-rotation post has a diameter greater than the first distance and less than the second distance, each pair of the anti-rotation posts is provided on respective radial arc face, a spring is arranged between two anti-rotation posts of each pair to provide a potential energy to the anti-rotation posts so that the anti-rotation posts are slidably moved constantly in the direction of the latching angle; and a cover plate arranged to rotatably cover the other end of the outer ring portion, and securely connected to the plurality of push pins, wherein the cover plate has an external gear to operatively connect with the manual mechanism;

wherein, when the manual mechanism is manually operated, the plurality of push pins urge the bidirectional rotary block to rotate the rotary shaft, but when the rotary shaft intends to rotate, the plurality of anti-rotation posts lock the bidirectional rotary block, so as to preclude the rotary shaft from rotating.

2. The electrical door operator according to claim 1, further comprising:

a partition plate fixed to a housing of the door operator, the partition plate having one end face fixedly connected to the outer ring portion of the locking mechanism, and the other end face provided with a bearing support;

wherein the manual mechanism comprises a force output shaft having one end extended beyond the housing and provided with a chain disk or a crank, and the other end pivotally mounted at the bearing support of the partition plate to support a drive gear engageable with the external gear through a gear set.

3. The electrical door operator according to claim 1, wherein:

one end of the drive shaft of the electric motor is fixedly connected with a drive disk, a second end of the rotary shaft is pivotally mounted at the drive disk in an axially slidable fashion;

an electromagnetic brake mechanism comprises an electromagnetic generator, a brake disk, and a spring member, the electromagnetic generator is disposed proximate to the second end of the rotary shaft and fixedly connected to a housing of the door operator; the rotary shaft is axially and slidably disposed on the brake disk, one end face of the brake disk is arranged to oppose the drive disk and the other end to oppose the electromagnetic generator; the spring member is disposed outside the rotary shaft to bias the brake disk to abut the drive disk;

when the electric motor is in operation, the electromagnetic generator attracts the brake disk, so that the brake disk resists the spring member and retracts, thereby disengaging from the drive disk during a brake release state;

when the electric motor is not in operation, the electromagnetic generator ceases to excite, the brake disk is acted on by the spring force of the spring member to urge against the brake disk during a brake state.

4. The electrical door operator according to claim 3, wherein the drive disk is axially connected with a driven disk, the brake disk is disposed between the drive disk and the driven disk; the electromagnetic brake mechanism further comprises a driving disk which is axially and slidably mounted on the rotary shaft, and is disposed between the electromagnetic generator and the driven disk: when the electric motor is not in operation, the spring member urges the driving disk and the brake disk to abut the driven disk and the drive disk, whereby the drive shaft is locked and prevented from rotating; and when the electric motor is in operation, the electromagnetic generator is excited and attracts the driving disk, so that the driving disk and the brake disk disengage from the driven disk and drive disk to release the drive shaft.

5. The electrical door operator according to claim 4, wherein the driven disk is coaxially connected to and slidably with respect to the drive disk, and a gap is maintained between the driven disk and the drive disk by means of a plurality of return springs; a plurality of brake linings are provided on a side surface of the brake disk and the driving disk facing the driven disk; the spring member urges against the driving disk, the driven disk the brake disk, and the drive disk in stacked condition, so that the end faces of the stacked driving disk, driven disk, and drive disk frictionally engage each other as a result of the action of the brake linings, thereby effecting a brake state.

6. The electrical door operator according to claim 3, further comprising a brake release mechanism arranged between the locking mechanism and the electromagnetic brake mechanism and surrounding the rotary shaft; wherein the brake release mechanism comprises a stationary cam member fixedly connected to the electromagnetic generator, a movable cam member fixedly connected to the rotary shaft, and a release lever, the movable cam member includes a cam face on a surface thereof that opposes a surface of the stationary cam member that also includes a cam face thereon, the release lever has one end connected to the movable cam member, and the other end extended beyond a housing of the door operator; when the release lever is actuated, the movable cam member is rotated, and the cooperation between the cam face thereof with the cam face of the stationary cam member causes the rotary shaft to displace axially in a sliding fashion, and the brake disk disengages from the drive disk, whereby the drive shaft is released.

7. The electrical door operator according to claim 3, further comprising a centrifugal braking mechanism that surrounds an outer periphery of the drive disk, wherein the centrifugal brake mechanism includes a brake drum fixedly connected to a housing of the door operator, and a pair of centrifugal brake shoes secured to the drive disk at one end, and urged against the brake drum due to the centrifugal force at the other end , thereby frictionally engage the brake drum to reduce the rotational speed of the drive shaft to a predetermined safe range.

8. The electrical door operator according to claim 3, further comprising a reduction mechanism arranged between the other end of the drive shaft of the electric motor and an output shaft, wherein the reduction mechanism reduces the rotational speed of the electric motor by means of the cooperation between a sun gear set, a planetary gear set, and an internal gear set, and transmits the reduced speed to the output shaft.

* * * * *